(12) United States Patent
Yang

(10) Patent No.: US 8,863,261 B2
(45) Date of Patent: *Oct. 14, 2014

(54) USER AUTHENTICATION APPARATUS, METHOD THEREOF AND COMPUTER READABLE RECORDING MEDIUM

(71) Applicant: Samsung Electronics Co., Ltd., Gyeonggi-do (KR)

(72) Inventor: Pil-seung Yang, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 13/770,540

(22) Filed: Feb. 19, 2013

(65) Prior Publication Data
US 2013/0167215 A1  Jun. 27, 2013

Related U.S. Application Data

(63) Continuation-in-part of application No. 12/416,972, filed on Apr. 2, 2009, now Pat. No. 8,402,509.

(30) Foreign Application Priority Data

Jul. 4, 2008  (KR) .................. 10-2008-0064805

(51) Int. Cl.
*G06F 21/31*  (2013.01)
*H04L 29/06*  (2006.01)
*G06F 21/35*  (2013.01)

(52) U.S. Cl.
CPC ............ *G06F 21/31* (2013.01); *H04L 63/0853* (2013.01); *G06F 21/35* (2013.01)
USPC ................................................ 726/7; 713/168

(58) Field of Classification Search
None
See application file for complete search history.

(56) References Cited

U.S. PATENT DOCUMENTS

| 7,623,970 B2* | 11/2009 | Kondo et al. .................. 702/19 |
| 2002/0141586 A1* | 10/2002 | Margalit et al. ............... 380/270 |
| 2004/0139020 A1 | 7/2004 | Ono |
| 2006/0294388 A1 | 12/2006 | Abraham et al. |
| 2008/0117201 A1 | 5/2008 | Martinez et al. |
| 2008/0289030 A1 | 11/2008 | Poplett |
| 2012/0185928 A1* | 7/2012 | Suzuki ............................ 726/9 |

FOREIGN PATENT DOCUMENTS

| JP | 2004-220207 A | 8/2004 |
| JP | 2006-31534 A | 2/2006 |

OTHER PUBLICATIONS

Communication, dated May 22, 2014, issued by the Korean Intellectual Property Office in counterpart Korean Patent Application No. 10-2008-0064805.

* cited by examiner

*Primary Examiner* — Fikremariam A Yalew
(74) *Attorney, Agent, or Firm* — Sughrue Mion, PLLC

(57) ABSTRACT

A user authentication apparatus, a user authentication method, and a computer readable recording medium are provided. The user authentication apparatus includes: an information collection unit which collects authentication information on a plurality of portable devices of a user through a communication network; and a control unit which identifies whether each of the plurality of portable devices is registered for the user or not based on the collected authentication information, determines whether an amount of information collected from the plurality of portable devices that are identified is greater than a threshold value, and authenticates the user.

18 Claims, 10 Drawing Sheets

USER AUTHENTICATION APPARATUS, METHOD THEREOF AND COMPUTER READABLE RECORDING MEDIUM

CROSS-REFERENCE TO RELATED APPLICATIONS

This application is a Continuation-In-Part Application of application Ser. No. 12/416,972 filed on Apr. 2, 2009 which claims priority from Korean Patent Application No. 10-2008-0064805, filed on Jul. 4, 2008 in the Korean Intellectual Property Office, the disclosure of which is incorporated herein by reference in its entirety.

BACKGROUND OF THE INVENTION

1. Field of the Invention

Apparatuses and methods consistent with the present invention relate to user authentication and a computer readable recording medium, and more particularly, to user authentication which identifies a user using user information of personal portable devices, and a computer readable recording medium.

2. Description of the Related Art

Various kinds of user authentication apparatuses and methods have been suggested to allow only authorized users to access systems, resources or applications. In general, for user authentication, an authentication key, a card key, or a password have been used. However, authentication methods using an authentication key or a card key may increase inconvenience since a user needs to take the key, and an authentication method using a password possesses a risk of leaking the password to unauthorized users.

In order to solve such problems, authentication methods using biometric recognition such as voice recognition, facial recognition, fingerprint recognition, iris recognition, and vein recognition have been introduced. However, authentication methods using voice recognition and facial recognition may have a high possibility of errors in authentication while employing comparatively simple structure, and authentication methods using fingerprint recognition, iris recognition, and vein recognition have comparatively few errors in authentication but require devices having complex structure.

In addition, such authentication methods using biometric recognition raise user inconvenience since the user should be in contact with or close to authentication devices. If authentication information regarding biometrics leaks, damage may be greater than in an authentication method using a password, thereby causing user aversion.

Therefore, there is a need for methods for performing user authentication more conveniently and securely.

SUMMARY OF THE INVENTION

Exemplary embodiments of the present invention address at least the above problems and/or disadvantages and other disadvantages not described above. Also, the present invention is not required to overcome the disadvantages described above, and an exemplary embodiment of the present invention may not overcome any of the problems described above.

According to an aspect of an exemplary embodiment, there is provided a user authentication apparatus including: an information collection unit which collects authentication information on a plurality of portable devices of a user through a communication network; and a control unit which identifies whether each of the plurality of portable devices is registered for the user or not based on the collected authentication information, determines whether an amount of information collected from the plurality of portable devices that are identified is greater than a threshold value, and authenticates the user.

The information collection unit may access at least one of a wired communication network and a wireless communication network and may collect the (authentication information.

The information collection unit may access a cable network or an internet as the wired communication network, and may collect the authentication information, and the information collection unit may access one of a CDMA network, an WCDMA network, a GSM network, an EPC network, an LTE network, and a Wi-bro network as the wireless communication network, and may collect the user information.

The wired communication network and the wireless communication network may include an access point to perform a short distance communication.

The collected authentication information may include user information and apparatus identification information, and the user information may include at least one of a name, a resident registration number, an employee identification number, and a cell phone number of the user.

The user information may be same user information that is commonly owned by the plurality of portable devices or user information that is individually owned by the plurality of portable devices in relation to the user.

The control unit may give a weighting to an amount of user information according to a characteristic of an apparatus that has collected the user information.

The user authentication apparatus may further include a user interface unit which, if the amount of collected user information is less than a threshold value, requests additional user information.

The user authentication apparatus may further include a storage unit which stores user authentication information indicating whether a user is authorized or not, and the control unit may identify the stored user authentication information corresponding to the user and may authenticate the user.

The amount of information may include a number of the plurality of portable devices.

According to an aspect of another exemplary embodiment, there is provided a user authentication method including: collecting authentication information on a plurality of portable devices of a user via a communication network; identifying whether each of the plurality of portable devices is registered for the user based on the collected authentication information; and authenticating the user by determining whether an amount of information collected from the plurality of portable devices that are identified is greater than a threshold value.

The collected authentication information may include user information and apparatus identification information, and the user information may include at least one of a name, a resident registration number, an employee identification number, and a cell phone number of the user.

The user information may be same user information that is commonly owned by the plurality of portable devices or user information that is individually owned by the plurality of portable devices in relation to the user.

The authenticating the user may include giving a weighting to an amount of user information according to a characteristic of an apparatus that has collected the user information.

The user authentication method may further include, if the amount of collected user information is less than a threshold value, requesting additional user information.

The user authentication method may further include storing user authentication information indicating whether a user is authorized or not, and the authenticating the user may include identifying the stored user authentication information corresponding to the user and authenticating the user.

The amount of information may include a number of the plurality of portable devices.

According to an aspect of still another exemplary embodiment, there is provided a computer readable recording medium which stores a program for executing a user authentication method, the user authentication method including: collecting authentication information on a plurality of portable devices of a user via a communication network; identifying whether each of the plurality of portable devices is registered for the user based on the collected authentication information; and authenticating the user by determining whether an amount of information collected from the plurality of portable devices that are identified is greater than a threshold value.

BRIEF DESCRIPTION OF THE DRAWINGS

The above and/or other aspects of the present invention will be more apparent by describing certain exemplary embodiments of the present invention with reference to the accompanying drawings, in which.

DETAILED DESCRIPTION OF EXEMPLARY EMBODIMENTS OF THE INVENTION

Figure 1:
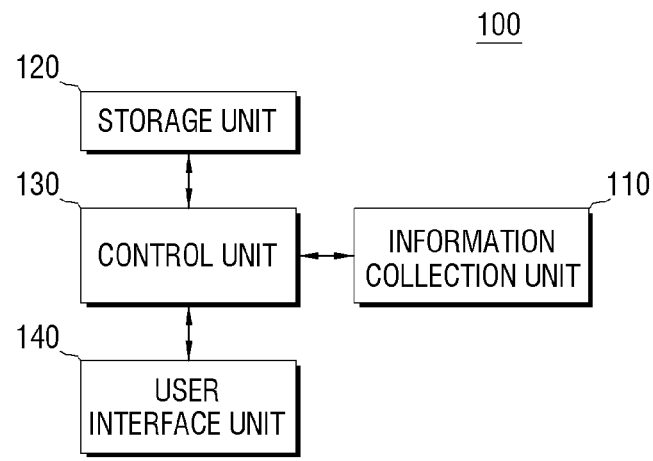
FIG. 1 is a schematic block diagram of a user authentication apparatus according to an exemplary embodiment of the present invention.

Certain exemplary embodiments of the present invention will now be described in greater detail with reference to the accompanying drawings.

In the following description, like drawing reference numerals are used for like elements, even in different drawings. The matters defined in the description, such as detailed construction and elements, are provided to assist in a comprehensive understanding of the invention. However, the present invention can be practiced without those specifically defined matters. Also, well-known functions or constructions are not described in detail since they would obscure the invention with unnecessary detail.

FIG. 1 is a schematic block diagram of a user authentication apparatus according to an exemplary embodiment of the present invention.

Referring to FIG. 1, the user authentication apparatus 100 may include an information collection unit 110, a storage unit 120, a control unit 130, and a user interface unit 140.

The information collection unit 110 collects user information from personal portable devices within a certain distance of the user authentication apparatus 100. More specifically, if there is a person within a detectable coverage area of the user authentication apparatus 100, the information collection unit 110 searches for personal portable devices within the detectable coverage area and collects user information from the personal portable devices using a short range communication scheme such as radio frequency identification (RFID), Bluetooth, and Zigbee.

For example, if a person is located in front of an automated teller machine (ATM) or an entrance to a premises for user authentication, the information collection unit 110 determines that there is a user authentication request for withdrawing money from the ATM or for entering the premises. Since personal portable devices are generally carried by the user him or herself or the user's bag, the information collection unit 110 may collect user information by searching for portable devices within approximately 1 m to 2 m radius of the user or within approximately 2 m to 3 m radius of the ATM.

The user information may be information on a user which a plurality of personal portable devices share in common, or information on a user which a plurality of personal portable devices have individually. In greater detail, the user information may be information such as the cell phone number of a user as well as general information representing the user's identity such as the name, resident registration number, and employee identification number. Such user information may not be included in all of the personal portable devices. That is, a single personal portable device may include information on the user, and the remaining personal portable devices may include information indicating that the remaining personal portable devices are operated by the same user as the user of the personal portable device including the information on the user. For example, the information collection unit 110 may collect as user information portable device identification information or information on a common key between the portable devices from a single personal portable device.

For example, if a user carries personal portable devices such as a cell phone, an MPEG audio layer 3 (MP3) player, and a laptop computer, which are connected through a common key, the information collection unit 110 searches for the cell phone, the MP3 player, and the laptop computer within a predetermined distance and determines that these personal portable devices belong to the single user if the personal portable devices are connected using a common key. If the information collection unit 110 collects the cell phone number of the user from the cell phone, the user can be identified using the information.

The storage unit 120 stores user authentication information indicating the presence or absence of user authentication for each individual user. The user authentication information is information indicating whether or not access to a corresponding system is allowed. The storage unit 120 may further store general user information and information on user's preferences in addition to the user authentication information. In this exemplary embodiment of the present invention, the storage unit 120 is installed in the user authentication apparatus 100. However, the storage unit 120 may also be implemented as a separate element in which intended information is searched using an external server.

The user interface unit 140 displays a current state of authentication being processed so that the user can identify it, and receives input of user information needed for user authentication. The user interface unit 140 may include a plurality of function keys to receive input of user information and user commands, and may display whether or not user authentication is performed and user authentication being processed through a display element such as a liquid crystal display (LCD). Alternatively, the user interface unit 140 may be implemented as an audio apparatus which informs the user of authentication information using audio signals.

The control unit 130 identifies the user based on an amount of user information. More specifically, the control unit 130 determines whether or not user information collected by the information collection unit 110 is information on the corresponding user, and identifies a user corresponding to the collected user information if the amount of the collected user information is larger than a threshold value.

For example, when the user carries a cell phone and a laptop computer which include information on his or her identity, the information collection unit 110 collects user information included in the two devices, and the control unit 130 determines that the two devices are personal portable devices belonging to the same user if the collected user information shares a common authentication key or the same cell phone number. Subsequently, the control unit 130 may perform user identification by determining whether or not the amount of information is larger than a predetermined amount of information assuming that the number of pieces of user information collected from the devices or the number of personal portable devices which provide the user information is considered as the amount of information.

The amount of collected information may be determined by measuring the number of devices from which the collected information is obtained, or by applying a weight to the amount of corresponding user information according to the characteristic of a device from which the corresponding user information is collected. In greater detail, in the case of an expensive personal portable device, or a personal portable device used only by the user such as a cell phone or an RFID identification card, the amount of user information may be determined by applying a higher weight to such personal portable devices than other personal portable devices. Accordingly, the control unit 130 can measure the amount of the user information collected by the information collection unit 110, and determine if the measured amount of the collected user information is larger than the predetermined amount.

In addition, the control unit 130 may determine that a predetermined personal portable device is an indispensable personal portable device for user authentication. Accordingly, even when the amount of the collected user information is larger than the predetermined amount, if there is not the indispensable personal portable device, user authentication cannot be performed.

The control unit 130 may request additional user information. For example, the control unit 130 controls the user interface unit 140 to request additional user information if the amount of the collected user information is not larger than the threshold value. More specifically, if the amount of the collected user information is not larger than the threshold value due to temporary turning off of wireless operation of a personal portable device of the user or the existence of a personal portable device such as a magnetic card incapable of wireless communication for user information, the control unit 130 may control the user interface unit 140 to inform the user to additionally collect the user information.

If the additional user information is collected by the information collection unit 110, the control unit 130 can perform the user identification process described above using the additional user information and the previously collected user information. In addition, if the amount of user information collected by the information collection unit 110 is insufficient, the control unit 130 may perform other user authentication processes using an identification or a password.

If user identification can be performed using the sufficient amount of user information collected by the information collection unit 110, the control unit 130 can perform user authentication by identifying user authentication information pre-stored in the storage unit 120. More specifically, if the identified user has authentication, the control unit 130 can perform an operation requested by the user. As described above, the operation of the control unit 130 may vary according to the types of implementation. Since the process of performing user authentication using the pre-stored information is known well, detailed description is omitted here.

The control unit 130 may perform operation requested by the user directly based on the information collected from the personal portable devices of the user and information on the user which is pre-stored in the storage unit 120 without authentication. For example, if the user authentication apparatus 100 is a terminal device such as a personal computer accessible to the Internet, the user authentication apparatus 100 may display a personal setting screen for the user based on the collected user information, and provide the user with contents corresponding to the user based on pre-stored sex distinction and age of the user.

Figure 2:
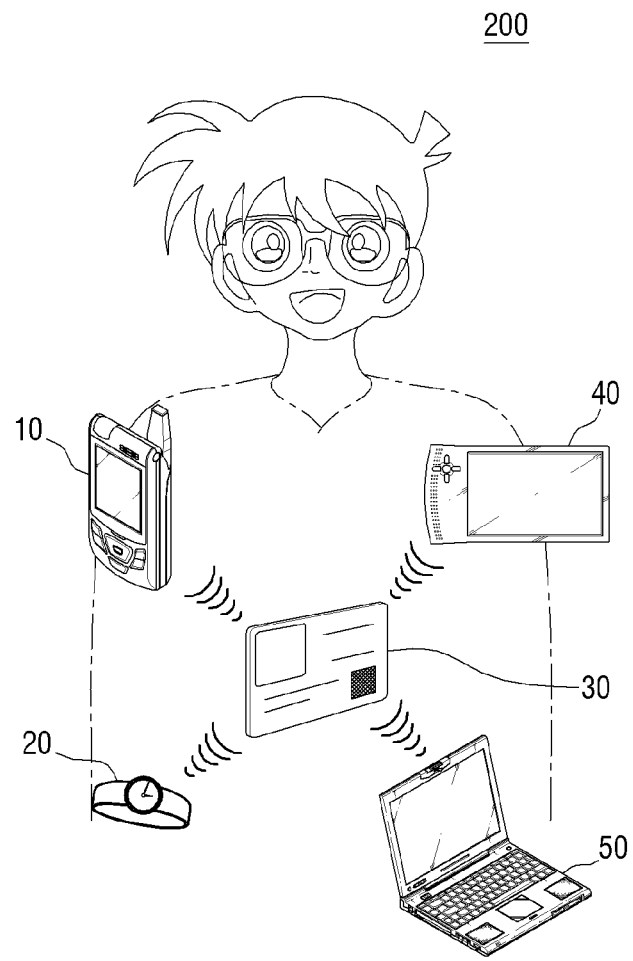
FIGS. 2 and 3 are drawings illustrating a user authentication process using a plurality of personal portable devices.
Figure 3:
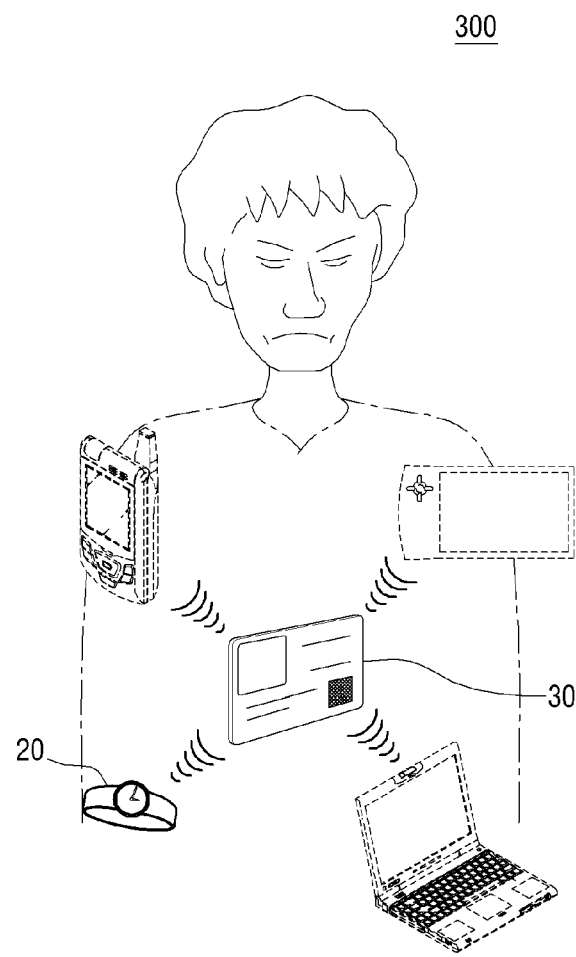

FIG. 2 illustrates user authentication by an authorized user, and FIG. 3 illustrates user authentication by an unauthorized user.

It is assumed that in order to withdraw money using an ATM or pass through an entrance to a premises, the user carries portable devices capable of identifying user identity and is located in an area in which the user authentication apparatus 100 can operate.

Referring to FIG. 2, a user carries personal portable devices capable of identifying user identity, including a cell phone 10, a watch 20, an RFID card 30, a portable media player (PMP) 40, and a laptop computer 50. The user authentication apparatus 100 collects user information regarding the user from the cell phone 10, the watch 20, the RFID card 30, the PMP 40, and the laptop computer 50, and may determine that the user requesting user authentication is the person himself since the number, i.e., 5 of personal portable devices from which the user information are obtained is larger than a predetermined value.

In the meantime, referring to FIG. 3, a user tries to receive user authentication using a cell phone of another person, a watch 20, and an RFID card 30. Since the user authentication apparatus 100 obtains user information regarding only the user from the watch 20 and the RFID card 3, and there are only two personal portable devices from which the user information is obtained, the user authentication apparatus 100 may determine that the collected amount of the user information is insufficient. In this case, the user authentication apparatus 100 may request personal portable devices to obtain additional user information or the user to provide additional user information. Therefore, although a personal portable device of the user may be lost and used by another person, unauthorized access of the other person can be prevented.

In the exemplary embodiment of the present invention described with reference to FIGS. 1 to 3, user authentication is performed using a plurality of portable devices of the user, but user authentication is not limited thereto. User authentication may be performed by a combination of this method using a plurality of portable devices of the user and a conventional method using an identification and a password, and may also be performed by a combination of this method using a plurality of portable devices of the user and a conventional method using a magnetic card.

Figure 4:
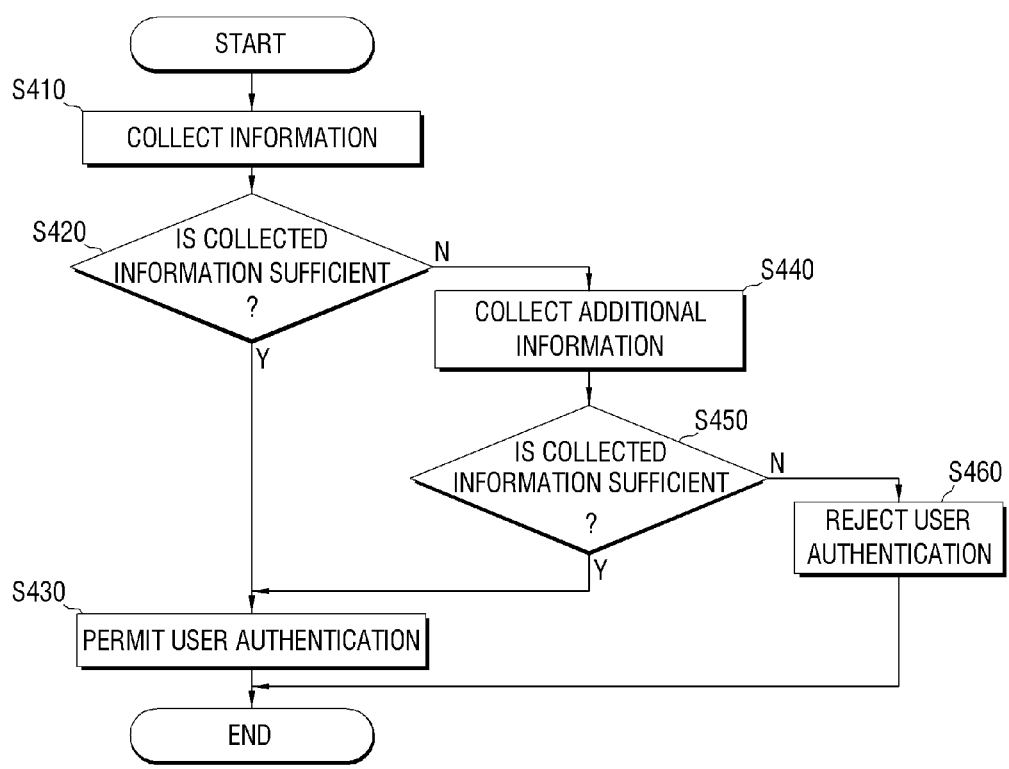
FIG. 4 is a flowchart illustrating a user authentication method according to an exemplary embodiment of the present invention.

FIG. 4 is a flowchart illustrating a user authentication method according to an exemplary embodiment of the present invention.

The user authentication apparatus 100 collects user information from a plurality of personal portable devices within a predetermined distance (S410). More specifically, if there is a person within a detectable coverage area of the user authentication apparatus 100, the user authentication apparatus 100 searches for personal portable devices within the detectable coverage area and collects user information from the personal portable devices using a short range communication scheme such as radio frequency identification (RFID), Bluetooth, and Zigbee.

If the user information is collected, the authentication apparatus 100 identifies the user based on the amount of the collected user information (S420). More specifically, it is determined whether or not the collected user information is obtained from a personal portable device belonging to the user being identified. If the amount of the collected user information is larger than a threshold value, the authentication apparatus 100 identifies the user as a user corresponding to the collected user information.

The amount of collected information may be determined by applying a weight to the amount of corresponding user information according to the characteristic of a device from which the corresponding user information is collected. For example, in the case of a personal portable device having high dependence on the user, a high weight is applied, and in the case of a personal portable device having low dependence on the user, a low weight is applied. Thus, the user may be identified according to the determination of whether or not the sum of the weight applied information is higher than a predetermined value.

Subsequently, user authentication is performed by identifying pre-stored user authentication information representing whether or not there is permission for the identified user (S430). Alternatively, whether to authenticate an operation requested by the user may be determined based on the amount of the collected information and the collected information instead of based on pre-stored information.

If the amount of the collected user information is not larger than the threshold value, the authentication apparatus 100 may request additional user information to the user (S440). If the user provides the authentication apparatus 100 with additional user information, the amount of user information may be determined based on the additional user information and the existing user information (S450). The additional user information may be obtained using information on a conventional identification and password as well as from additional personal portable devices. If additional user information may not be obtained, the authentication apparatus 100 rejects user authentication and finishes the operation (S460).

As described above, since user authentication is performed using personal portable devices usually carried by the user, the user does not need to separately carry an authentication key or a card key for authentication and thus user authentication is performed simply and rapidly over short range communications. Consequently, a user authentication method according to the exemplary embodiment of the present invention may increase convenience.

Figure 5:
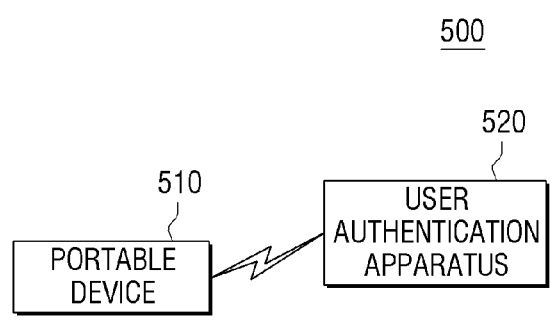
FIG. 5 is a drawing illustrating a user authentication system according to an exemplary embodiment of the present invention.

FIG. 5 is a drawing illustrating a user authentication system according to an exemplary embodiment of the present invention.

As shown in FIG. 5, a user authentication system 500 according to an exemplary embodiment includes a portable device 510 and a user authentication apparatus 520.

The portable device 510 may include a cell phone 10, a watch 20, an RFID card 30, a portable media player (PMP) 40, and a laptop computer 50 as shown in FIGS. 2 and 3, and may further include an MP3 player and an accessory such as glasses. The portable device 510 according to an exemplary embodiment may include any electronic apparatus and accessory if it includes a communicable module.

Also, the user authentication apparatus 520 may include a portable apparatus to unlock or make near field communication (NFC) payment in addition to enter an ATM or an entrance as described above, or a door lock apparatus for a house or a car. Also, the user authentication apparatus 520 may further include a PC or a vending machine which sells alcohols or cigarettes banned for children and teens. Also, the user authentication apparatus 520 may further include an apparatus for executing a certain application.

The user authentication apparatus 520 performs user authentication using user information which is collected from the portable device 510. For example, if a cell phone is locked, the user authentication apparatus 520 performs user authentication to unlock the cell phone. In the case of a vending machine, the user authentication apparatus 520 performs user authentication to determine whether the user is an adult. In the case of a PC, the user authentication apparatus 520 performs user authentication to log in the PC. The user authentication apparatus 520 may perform user authentication to execute a specific application. Furthermore, in the case of a cell phone, the user authentication apparatus 520 may perform authentication to make NFC payment, and, in the case of a PC or a cell phone, the user authentication apparatus 520 may perform to bank online.

If a user approaches the user authentication apparatus 520 or there is a request from a user, the user authentication apparatus 520 collects user information from the portable device 510 carried by the user, for example, from the portable device 510 including an accessory such as glasses, and determines whether the user is an authorized user or not using the collected information. In this process, the user authentication apparatus 520 may finally determine whether the user is an authorized user or not by determining whether the number of pieces of collected user information is greater than or equal to a predetermined number or not, or determining whether the user necessarily carries a specific portable device 510 having high importance or not.

Some scenarios according to exemplary embodiments may be suggested as follows: The first scenario is that the user unlocks a cell phone using an accessory carried by the user. The user may lock a display of the cell phone to prevent other people from carelessly using it and protect important information of the cell phone. However, the user may have inconvenience of having to unlock the cell phone every time that the user uses the cell phone. At this time, the user may find an auto lock function in the settings of the cell phone and activates the auto lock function. The auto lock function refers to a function that releases the lock function when the user uses the cell phone and activates the lock function when other people use the cell phone. The auto lock function can protect user information and also can increase user convenience.

The second scenario is that the user makes NFC payment using an accessory carried by the user. The user, who has bought a cell phone having an NFC payment function recently, does not feel easy about using an NFC payment system. This is because a credit card, which is an existing paying means, is taken out from a wallet only when payment is needed and thus is less likely to be lost, but a payment system embedded in a cell phone which is used almost every day is more likely to be stolen or lost. Therefore, the user decides to use the auto authentication system. The auto authentication system refers to a system that collects user information of a peripheral such as an accessory or an electronic apparatus at a time that payment is made, determines whether the collected information is consistent with information on the user who tries to make payment, and requests an additional authenticating means such as a password according to a result of determining when payment is made, thereby guaranteeing safe transaction between sellers and users. For example, by using such a system, an alcohol or cigarette store automatically determines whether to sell the alcohol or cigarette based on information of a person who makes payment, and thus is not required to perform separate authentication of an ID card.

Figure 6:
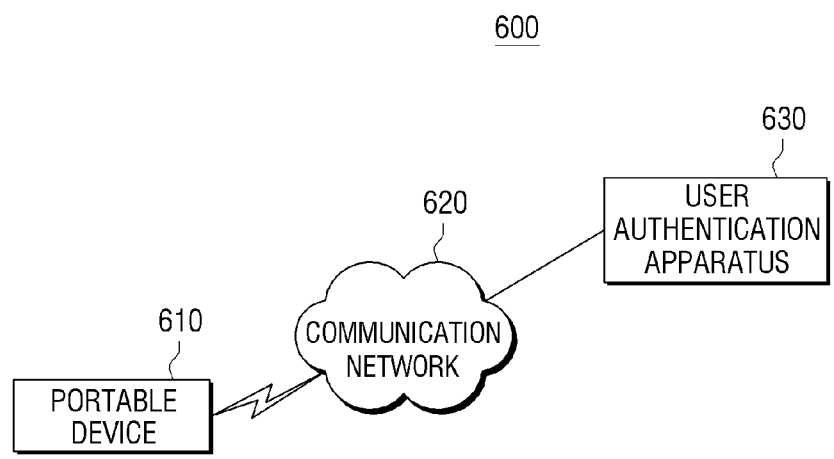
FIG. 6 is a drawing illustrating a user authentication system according to another exemplary embodiment of the present invention.

FIG. 6 is a drawing illustrating a user authentication system according to another exemplary embodiment of the present invention.

Referring to FIG. 6 along with FIG. 1, a user authentication system 600 according to another exemplary embodiment includes all or some of a portable device 610, a communication network 620, and a user authentication apparatus 630.

Since the user authentication apparatus 630 may be included in the communication network 620, the user authentication system 600 is described as including all or some of the elements. However, the user authentication system will be described as including all of the elements for the sake of assisting in fully understanding the invention.

The portable device 610 may include an electronic apparatus such as a personal digital assistance (PDA), a laptop computer, a smart phone, an MP3 player, and a PMP, and also, may include an accessory such as glasses or a watch. According to an exemplary embodiment, the portable device 610 may include a communication module. The communication module may communicate with the user authentication apparatus 630 located at a long distance via the communication network 620, and may communicate with another portable device 610 located at a short distance. The portable device 610 may further include a storage unit which stores user information.

According to the above-described configuration, if the user authentication apparatus 630 requests user information, the portable device 610 may provide user information stored therein. To achieve this, the portable device 610 may provide the user information by communicating with an access point of the communication network 620. In this process, the portable device 610 may communicate with another portable device located around the portable device 610 or an accessory, and may provide user information of the same user via an already registered portable device as a representative. To achieve this, the portable device 610 may further include a determination unit to determine whether the portable devices are owned by the same user or not based on the collected user information.

Also, the portable device 610 provides the user information stored therein by communicating with the communication network 620 according to a request of the user authentication apparatus 630. However, the portable device 610 may identify a user ID provided through the communication network 620, and, if the user ID is consistent with the stored user information, provides the user information, more specifically, authentication information, or may provide authentication information in response to only a registered user ID.

The communication network 620 includes a wired communication network and a wireless communication network. The wired communication network includes the internet such as a cable network or a public switched telephone network (PSTN), and the wireless communication network includes a code division multiple access (CDMA) network, a WCDMA network, a global system for mobile communications (GSM) network, an evolved packet core (EPC) network, a long term evolution (LTE) network, and a Wi-bro network. If the communication network 620 is a wired communication network, the communication network 620 may access a telephone exchange station of a telephone company, and, if the communication network 620 is a wireless communication network, the communication network 620 may access a serving GPRS support node (SGSN) or a gateway GPRS support node (GGSN) which is operated by a communication service provider, and may process data, or may access various relay stations such as base station transmission (BTS), NodeB, and e-NodeB and may process data. Of course, this process includes notifying a result of user authentication by the communication network 620 or requesting additional information if authentication fails.

The communication network 620 may further include an access point (AP) of a small base station such as a femto or pico base station. The femto base station and the pico base station are distinguished from each other according to how many portable devices 610 can be connected to the small base station. The AP may include a short distance communication module to perform short distance communication with the portable device 610, such as Zigbee and Wi-Fi. The short distance communication recited herein may be performed according various standards such as Bluetooth, Zigbee, IrDA, radio frequency such as ultra high frequency (UHF) and very high frequency (VHF), and ultra wideband (UWB). Accordingly, the AP may extract a location of a data packet, designate an optimal communication path to the extracted location, and transmit the data packet to a next device, that is, the portable device 610, according to the designated communication path. The AP may share several lines in a general network environment and may include a router, a repeater, and a relay station, for example.

The user authentication apparatus 630 may refer to various kinds of apparatuses such as a cell phone, a security apparatus, a payment apparatus, a computer, and a car, and may refer to an apparatus included in these apparatuses. For example, the user authentication apparatus 630 may verify whether the user is an authorized user or not by performing authentication in order to unlock a cell phone, to prevent trespassing, to make payment, to log in a computer, and to open a door of a car. Of course, each user authentication apparatus performs user authentication and performs a different operation for a purpose (or function) according to a result of the authentication. In other words, if it is determined that the user is an authorized user, the user authentication apparatus may perform a detailed operation such as unlocking or making payment.

For example, it is assumed that a user wishes to unlock a cell phone or make NFC payment in the office located at a long distance. If the user requests unlocking of the cell phone, the request is notified to the communication network 620 and the communication network 620 collects user information of an accessory that the user left at home based on location information of the user according to the request, and performs authentication, thereby unlocking the cell phone according to a result of the authentication. Also, it is assumed that the user authentication apparatus is a vending machine. The vending machine collects user information from a single electronic apparatus carried by a user when the user approaches the vending machine, and identifies residence information on a residence where the user lives from the collected user information. Accordingly, the vending machine collects user information from the remaining portable devices or accessory that the user left at the residence, and determines whether the user is an authorized user or not based on the entire user information. If the portable devices include an apparatus having high importance such as an ID card, it may be determined whether the user is an authorized user or not according to whether the ID card is included or not. If the user wishes to a log in a computer located at a long distance or open a door of a house or a car, it is possible to perform authentication at a long distance using the communication network 620, and a thus a detailed explanation is omitted.

In view of these points, the user authentication apparatus 630 is not significantly different from the user authentication apparatus 100 of FIG. 1 in its structure. However, since the user authentication apparatus 630 of FIG. 6 performs authentication in a long distance communication method rather than a short distance communication method, the user interface unit 140 may further process uniform resource locator (URL) information including address information.

Figure 7:
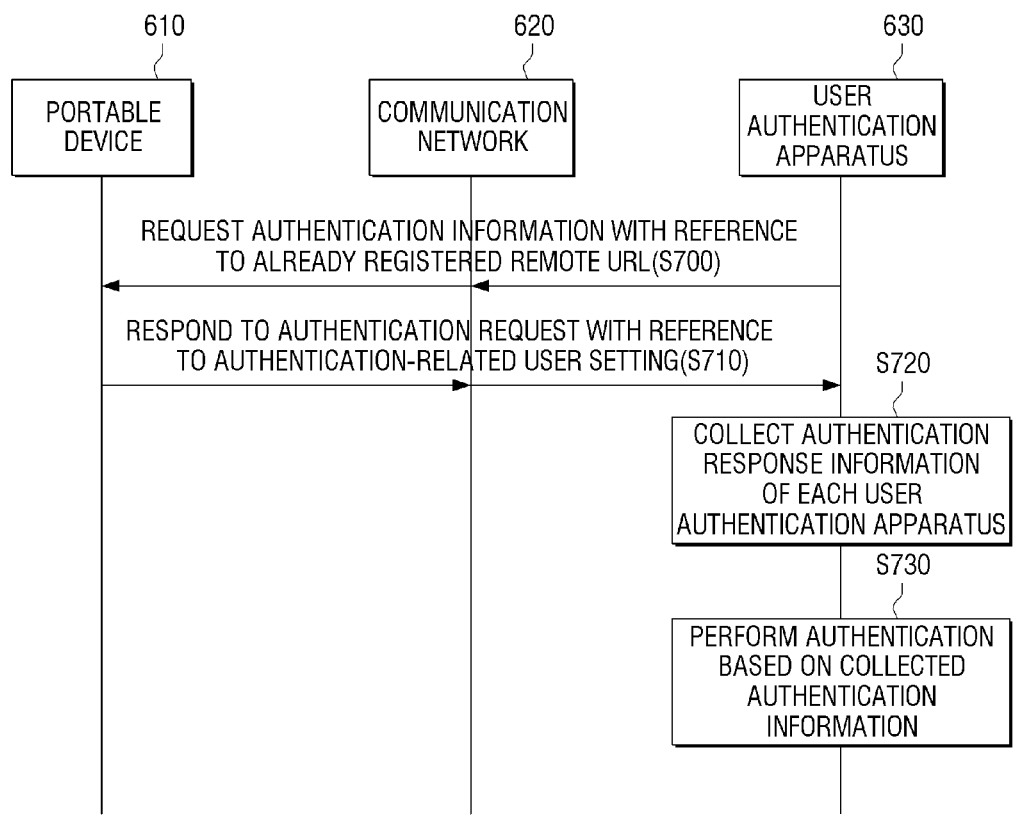
FIG. 7 is a drawing illustrating a process in which a user authentication apparatus performs authentication using already registered URL information according to an exemplary embodiment of the present invention.

FIG. 7 is a drawing illustrating a process in which a user authentication apparatus performs authentication using already registered URL information according to an exemplary embodiment of the present invention.

Referring to FIG. 7 along with FIG. 6, the user authentication apparatus 630 according to the first exemplary embodiment may request authentication information from each remote control apparatus, that is, the portable device 610, with reference to an already registered remote URL (S700). The user authentication apparatus 630 may include address (or physical) information of each of the plurality of portable devices 610 as already registered remote URL information. For example, if glasses, a watch, and a PMP of the portable devices 610 have address information 192.168.10.1~192.168.10.3, the already registered remote URL information may include physical information of each portable device 610. Accordingly, the user authentication apparatus 630 may request user information, that is, authentication information, from the plurality of portable devices 610 based on the already registered physical information when accessing an URL.

To achieve this, the communication network 620 transmits a request signal transmitted from the user authentication device 630 to the portable apparatus 610. In other words, the communication network 620 communicates with the portable apparatus 610 based on the URL information transmitted from the user authentication device 630, and transmits the request signal to the portable apparatus 610. The request signal may provide an apparatus ID, a service ID and a user ID as request information, and the service ID means an authentication service or a service ID indicating what kind of authentication service is requested. For example, the service ID may indicate a payment service or an unlocking service.

If there is such a request, each portable device 610 compares at least one of received apparatus ID, service ID and user ID with information stored therein, and determines whether the ID information is consistent with the stored information or not. The portable device 610 may provide the apparatus ID, the user ID, and a result of the determining to the user authentication apparatus 630 via the communication network 620 as response information (S710). For example, the portable device 610 may transmit corresponding information to the user authentication apparatus 630 by carrying it in a response message. In this process, the portable device 610 may respond to the request by determining whether a single user ID is consistent with stored information or may respond to the request by determining whether a plurality of registered user IDs are consistent with stored information.

If there is a portable device 610 registered in relation with the user, the portable device 610 may respond to the request in various ways such as transmitting its own user information via the registered portable device 610 or determining a number of portable devices 610 adjacent to the registered portable device 610 and providing a result of the determination as a representative value. At this time, the plurality of portable devices 610 may perform communication using a shared key.

The user authentication apparatus 630 collects the user information which is transmitted via the communication network 620, and performs user authentication based on the collected user information (S720 and S730). For example, if an amount of user information collected from the plurality of portable devices 610 is greater than or equal to a threshold value, it is determined that the user is an authorized user. Also, if the number of portable devices 610 is greater than or equal to a threshold value, authentication may be performed.

Figure 8:
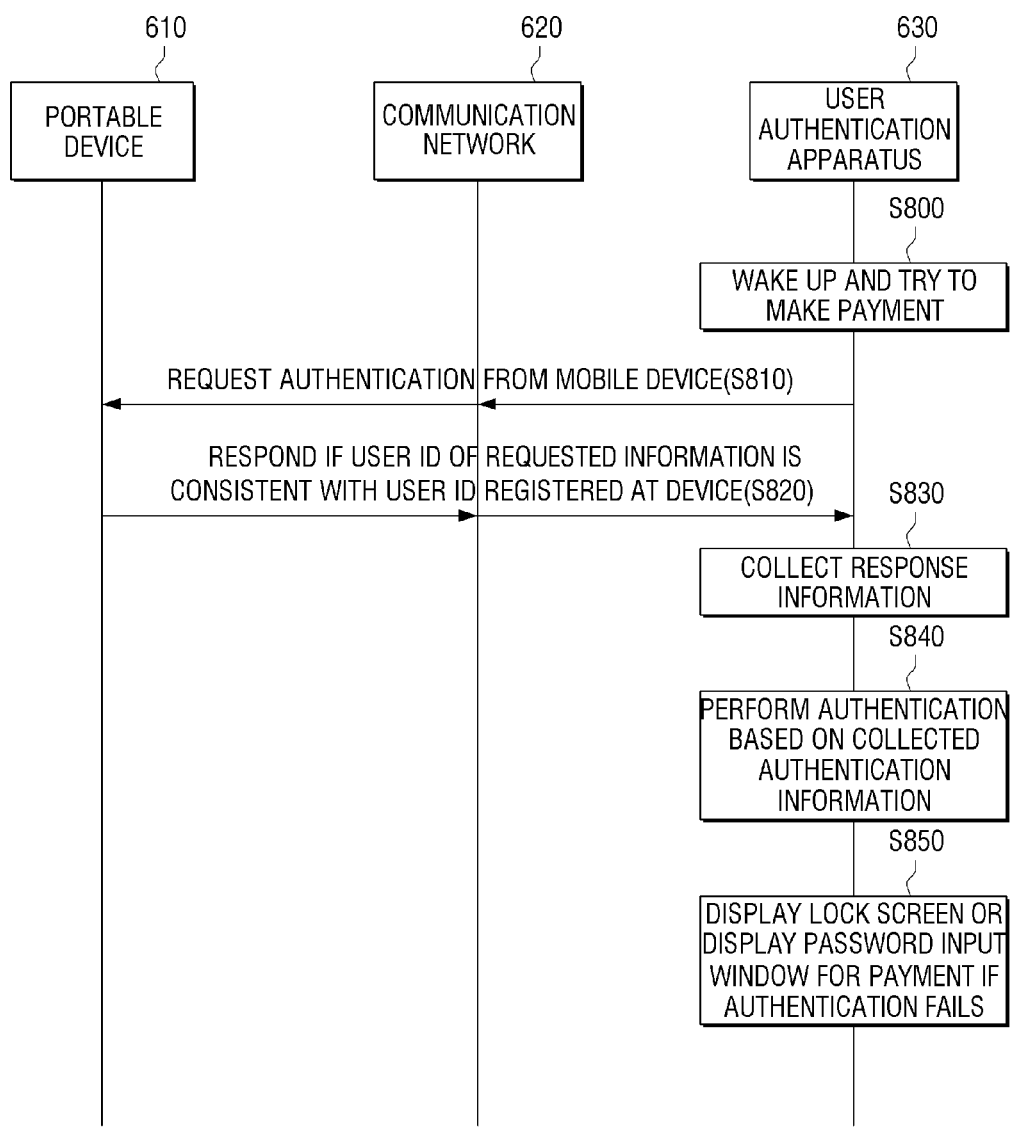
FIG. 8 is a drawing illustrating a process in which a user authentication apparatus performs authentication to make near field communication (NFC) payment if the user authentication apparatus is a cell phone according to an exemplary embodiment of the present invention.

FIG. 8 is a drawing illustrating a process in which a user authentication apparatus performs authentication to make NFC payment if the user authentication apparatus is a cell phone according to an exemplary embodiment.

Referring to FIG. 8 along with FIG. 6, the user authentication apparatus 630 according to the second exemplary embodiment, that is, a cell phone, performs a wake up operation and tries to make payment (S800). The wake up operation refers to an operation of activating a cell phone staying idle only in case of necessity.

According to such a payment trial, the user authentication apparatus 630 requests user information for authentication (or authentication information) from the portable device 610 (S810). In this process, the user authentication apparatus 630 may provide an apparatus ID and a user ID and may also provide address information.

The portable device 610 identifies the received user ID and, if it is determined that the user ID is consistent with a user ID registered in the portable device 610, informs the user authentication apparatus 630 (S820). At this time, the portable device 610 may provide the same apparatus ID and user ID as requested as response information.

The user authentication apparatus 630 collects the authentication information from the portable device 610 in the above-described way (S830). For example, if the portable devices 610 are glasses, a watch, or a PMP, the user authentication apparatus 630 collects authentication information from each device.

The user authentication apparatus 630 performs authentication based on the collected information (S840). For example, the user authentication apparatus 630 sets a threshold value and performs authentication by determining that the user is an authorized user if a result of the determining based on the collected information is greater than the threshold value. For example, if the threshold value is set to 3 and if more than three devices have the IDs consistent with the stored IDs, it is determined that the user is an authorized user.

If the authentication fails in this process, the user authentication apparatus 630, that is, the cell phone, may display a lock screen or may display an input window to allow the user to input a password to re-try payment (S850).

The operations shown in FIG. 8 may be applied to the case in which the cell phone is unlocked in the same way. For example, if the user authentication apparatus 630, that is, the cell phone, is located away from a user's residence, the communication network 620 transmits information by communicating with the portable devices 610 remaining in the residence, for example, accessories such as glasses or a watch, and the cell phone collects corresponding information, performs authentication, and is unlocked according to a result of the authentication.

Figure 9:
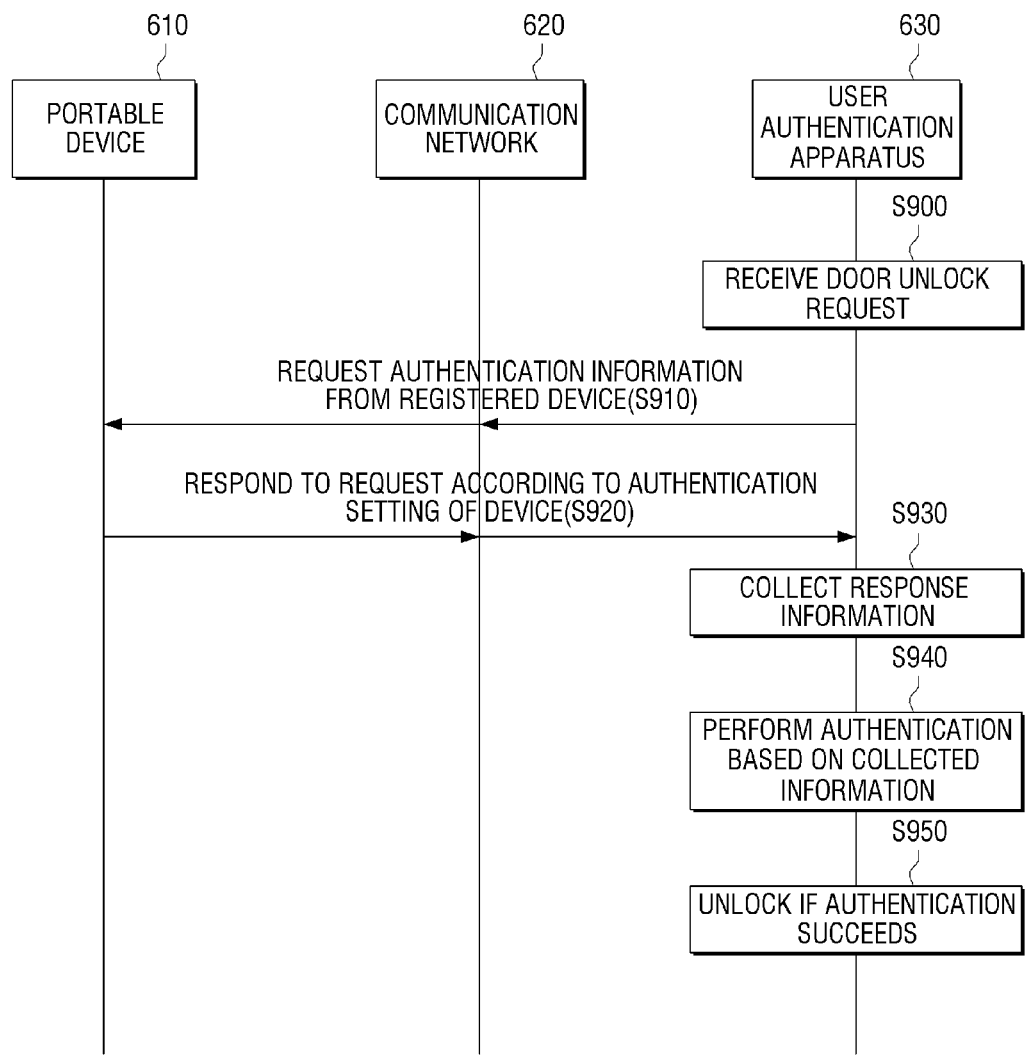
FIG. 9 is a drawing illustrating a process in which a user authentication apparatus performs authentication to unlock a door if the user authentication apparatus is a door lock apparatus according to an exemplary embodiment of the present invention.

FIG. 9 is a drawing illustrating a process in which a user authentication apparatus performs authentication to unlock if the user authentication apparatus is a door lock apparatus according to an exemplary embodiment.

Referring to FIG. 9 along with FIG. 6, if the user authentication apparatus 630 according to an exemplary embodiment is a door lock apparatus, the user authentication apparatus 630 may receive a request for unlocking from a user when the user approaches the user authentication apparatus 630 or may receive a separate request for unlocking from a user (S900).

If it is determined that there is a request, the user authentication apparatus 630 may request authentication information from a registered portable device 610 (S910). For example, the user authentication apparatus 630 may request the authentication information by providing an apparatus ID, a service ID, and a user ID of the portable device 610 based on URL information.

If there is such a request, the registered portable device 610 may provide the ID, that is, the apparatus ID, the user ID and resulting information indicating whether information is consistent with stored information (S920) in response to the request.

The user authentication apparatus 630 collects the response information and determines whether authentication succeeds or not based on the collected information (S930 and S940). For example, if all information of the registered portable device 610 is consistent with the stored information, it is determined that the authentication succeeds.

If the authentication succeeds as described above, the user authentication apparatus 630 may unlock a door (S940). If the authentication fails, the user authentication apparatus 630 does not unlock the door. That is, if all of the plurality of portable devices 610 succeed in performing authentication, the user authentication apparatus 630 unlocks the door.

Accordingly, if one portable device 610 is turned off when the user goes out a long while, the door can completely prohibit other people from entering and thus can tighten security.

Figure 10:
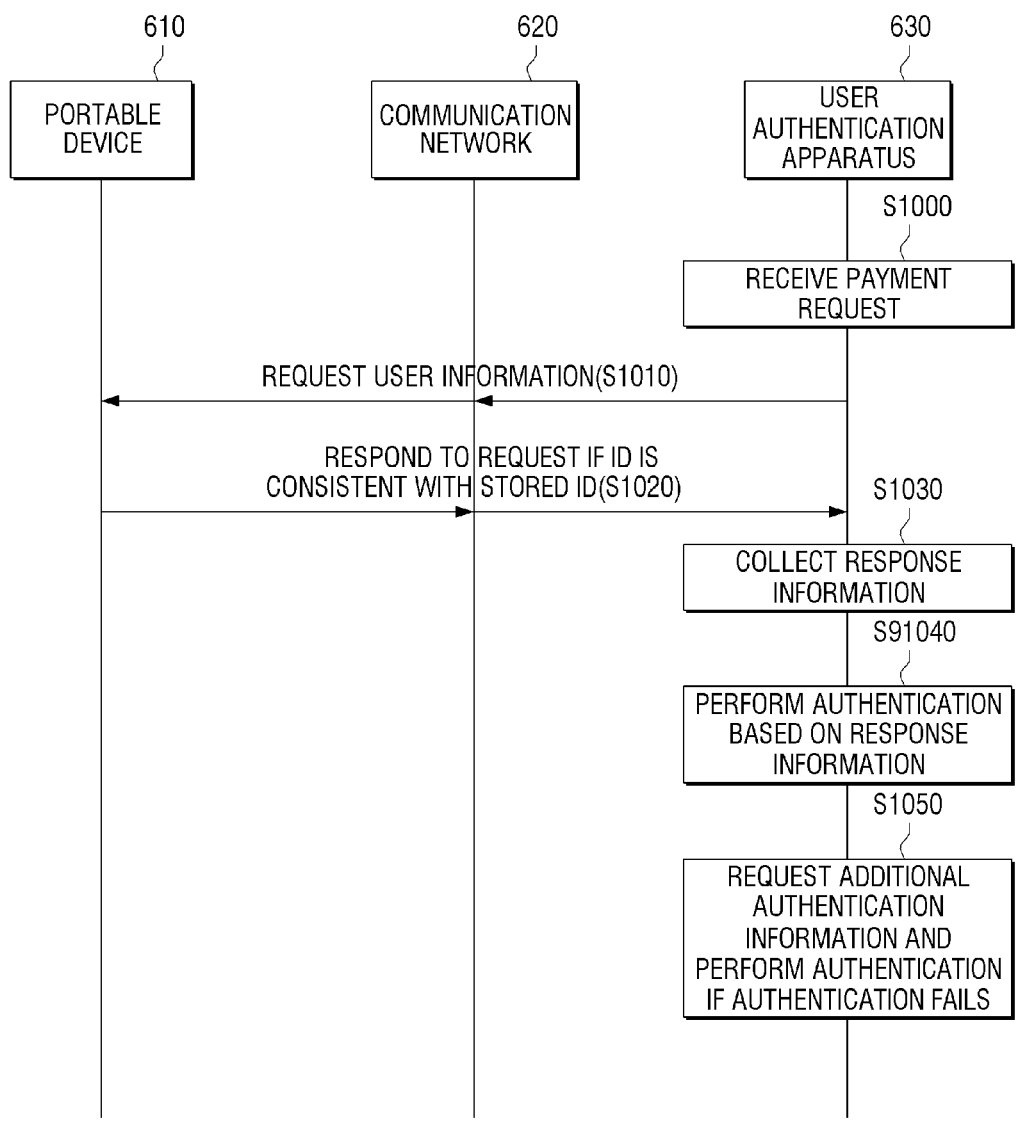
FIG. 10 is a drawing illustrating a process in which a user authentication apparatus performs authentication to make payment if the user authentication apparatus is a point of sale (POS) terminal according to an exemplary embodiment of the present invention.

FIG. 10 is a drawing illustrating a process in which a user authentication apparatus performs authentication to make payment if the user authentication apparatus is a POS terminal according to an exemplary embodiment of the present invention.

Referring to FIG. 10 along with FIG. 6, the user authentication apparatus 630 according to an exemplary embodiment, which is a point of sale (POS) terminal to make card payment, may receive a payment request from a person associated with payment on approval from a user (S1000). The POS terminal may be a terminal that is separately operated by a person who works in a financial institution.

If there is such a payment request, the user authentication apparatus 630 may request user information by providing IDs, that is, an apparatus ID, a service ID and a user ID, to the portable device 610 via the communication network 620 (S1010). The user information may include an apparatus ID, a user ID, and a service ID of a device.

If there is a request for user information, the portable device 610 determines whether the received user ID is consistent with an ID stored therein, and responds to the user authentication apparatus 630 only if the user ID is consistent with the stored ID (S1020). Accordingly, the response message may include the apparatus ID and the user ID. The response itself may be a result of determining that the user is the same user as stored.

The user authentication apparatus 630 receives and collects information from the plurality of portable devices 610 in the above-described way, and performs authentication based on the collected information (S1030 and S1040). At this time, the user authentication apparatus 630 may determine whether the authentication succeeds by comparing an amount of collected information or comparing a number of devices responded to the request. Of course, the number of devices may be identified based on the apparatus ID.

If the authentication fails, the user authentication apparatus 630 may request additional authentication information and may perform authentication (S1050). For example, the user authentication apparatus 630 may additionally request a card number of an ID card or a password as additional authentication information, and may perform authentication.

In the case of FIG. 10, in addition to a payment function to buy specific goods, the user authentication apparatus 630 may perform an ID card function in banking or may serve as an accredited certificate in online banking. In other words, the user authentication apparatus 630 may perform authentication through the process of FIG. 10 instead of requesting information of an ID card or performing authentication through an accredited certificate in a related-art method.

Figure 11:
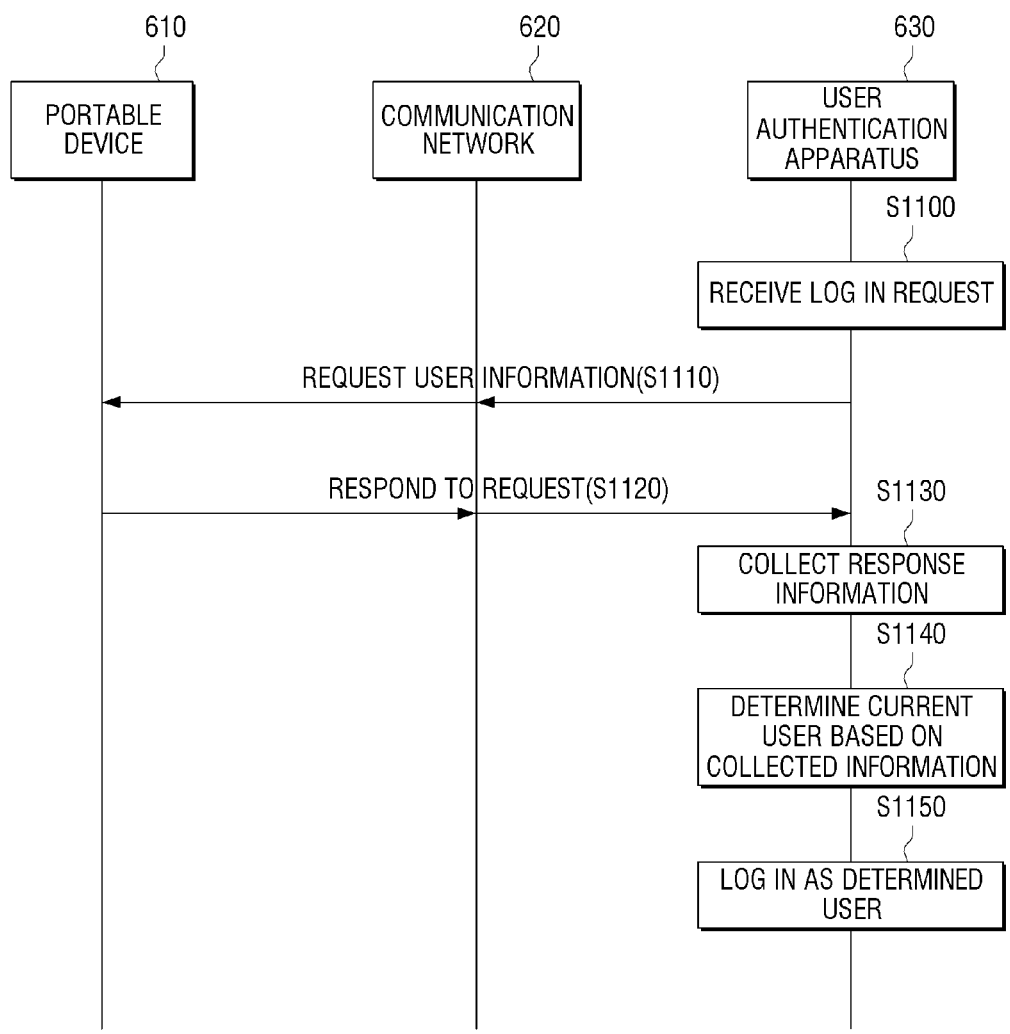
FIG. 11 is a drawing illustrating a process in which a user authentication apparatus performs authentication to log in if the user authentication apparatus is a personal computer (PC) according to an exemplary embodiment of the present invention.

FIG. 11 is a drawing illustrating a process in which a user authentication apparatus performs authentication to log in if the user authentication apparatus is a PC according to an exemplary embodiment of the present invention.

Referring to FIG. 11 along with FIG. 6, the user authentication apparatus 630 according to an exemplary embodiment, which is an apparatus that may be shared by a plurality of users, for example, a PC, may receive a log-in request (S1100). The log-in request may be performed when the user clicks a mouse on a log-in item.

If there is such a request, the user authentication apparatus 630 requests user information by providing an apparatus ID and a service ID regarding a corresponding log-in service to the portable device 610, determines whether the user is an authorized subscriber based on the user information collected in response to the request, and performs log-in (S1110-S1150). This process has been described above with reference to FIG. 10 and thus a redundant explanation is omitted.

The operations of FIG. 11 may be performed in the same way if the user authentication apparatus 630 needs to execute a specific application or the user authentication apparatus 630 is used in a car. For example, if the user approaches a car to open a door, operation S1100 corresponds to a process of recognizing that the user approaches the car, and operation S1150 corresponds to a process of unlocking the door of the car if the user is an authorized user.

Furthermore, in the case of a car, it is determined whether the user is an authorized user, and the car may be set according to the user. For example, a driver seat set for a user A may be set for a user B. To achieve this, the user authentication apparatus 630 may obtain user information from a cell phone of the user who approaches the car, determine whether the user is an authorized user or not based on the user information, and set the car.

Various exemplary embodiments of the present invention have been described above with reference to FIGS. 7 to 11. That is, although detailed functions are different according to what the user authentication apparatus 630 is used for, it is common that the user authentication apparatus 630 requests user information and a result indicating whether user information is consistent with stored user information or not from the portable device 610 located at a long distance via the communication network 620, and performs authentication based on authentication information which is received as a response to the request.

Although a driving process of the user authentication apparatus 630 which is differently performed according to various exemplary embodiments has not been separately described, it can be appreciated from the above descriptions of FIGS. 7 to 11 and a detailed description thereof is omitted.

According to an exemplary embodiment, a computer readable recording medium may include at least one execution program for executing a user authentication method in the user authentication apparatus 100, 520 and 630.

Accordingly, each of the blocks of the present invention may be embodied as a computer recordable code on a computer readable recording medium. The computer readable recording medium may be a device that can store data which is readable by a computer system.

The computer-readable recording medium may be a device capable of storing data which can be read by a computer system. For example, the computer-readable recording medium may be a read-only memory (ROM), a random-access memory (RAM), a compact disc (CD)-ROM, a magnetic tape, a floppy disc, an optical disc, an optical data storage device, or an image display device such as a television including a storage device. The computer-recordable code may be executed as a computer data signal of a carrier wave.

As can be appreciated from the above description, user authentication can be easily performed using personal portable devices of a user, resulting in increased user convenience.

The foregoing exemplary embodiments are merely exemplary and are not to be construed as limiting the present invention. The present teaching can be readily applied to other types of apparatuses. Also, the description of the exemplary embodiments of the present invention is intended to be illustrative, and not to limit the scope of the claims, and many alternatives, modifications, and variations will be apparent to those skilled in the art.

What is claimed is:

1. A user authentication apparatus comprising:
an information collection unit which collects authentication information on a plurality of portable devices of a user via a communication network; and
a control unit which identifies whether each of the plurality of portable devices is registered for the user based on the collected authentication information, and determines whether an amount of information collected from the plurality of portable devices that are identified is greater than a predetermined amount of information and whether the plurality of portable devices include a portable device predetermined to be indispensable for user authentication,
wherein the control unit authenticates the user if it is determined that the amount of information collected from the plurality of portable devices that are identified is greater than the predetermined amount of information, and the plurality of portable devices include the portable device predetermined to be indispensable for user authentication.

2. The user authentication apparatus as claimed in claim 1, wherein the information collection unit accesses at least one of a wired communication network and a wireless communication network and collects the authentication information.

3. The user authentication apparatus as claimed in claim 2, wherein the information collection unit accesses a cable network or an internet as the wired communication network, and collects the authentication information,
wherein the information collection unit accesses one of a CDMA network, an WCDMA network, a GSM network, an EPC network, an LTE network, and a Wi-bro network as the wireless communication network, and collects the user information.

4. The user authentication apparatus as claimed in claim 2, wherein the wired communication network and the wireless communication network comprise an access point to perform a short distance communication.

5. The user authentication apparatus as claimed in claim 1, wherein the collected authentication information comprises user information and apparatus identification information,
wherein the user information comprises at least one of a name, a resident registration number, an employee identification number, and a cell phone number of the user.

6. The user authentication apparatus as claimed in claim 5, wherein the user information is the same user information that is commonly owned by the plurality of portable devices or user information that is individually owned by the plurality of portable devices in relation to the user.

7. The user authentication apparatus as claimed in claim 5, wherein the control unit gives a weighting to an amount of user information according to a characteristic of an apparatus that has collected the user information.

8. The user authentication apparatus as claimed in claim 5, further comprising a user interface unit which, if the amount of collected user information is less than the predetermined amount of information, requests additional user information.

9. The user authentication apparatus as claimed in claim 1, further comprising a storage unit which stores user authentication information indicating whether a user is authorized or not,
wherein the control unit identifies the stored user authentication information corresponding to the user and authenticates the user.

10. The user authentication apparatus as claimed in claim 1, wherein the amount of information comprises a number of the plurality of portable devices.

11. A user authentication method comprising:
collecting authentication information on a plurality of portable devices of a user via a communication network;
identifying whether each of the plurality of portable devices is registered for the user based on the collected authentication information and determining whether an amount of information collected from the plurality of portable devices that are identified is greater than a predetermined amount of information and whether the plurality of portable devices include a portable device predetermined to be indispensable for user authentication; and
authenticating the user if it is determined that the amount of information collected from the plurality of portable devices that are identified is greater than the predetermined amount of information, and the plurality of portable devices include the portable device predetermined to be indispensable for user authentication.

12. The user authentication method as claimed in claim 11, wherein the collected authentication information comprises user information and apparatus identification information,
wherein the user information comprises at least one of a name, a resident registration number, an employee identification number, and a cell phone number of the user.

13. The user authentication method as claimed in claim 12, wherein the user information is the same user information that is commonly owned by the plurality of portable devices or user information that is individually owned by the plurality of portable devices in relation to the user.

14. The user authentication method as claimed in claim 12, wherein the authenticating the user comprises giving a weighting to an amount of user information according to a characteristic of an apparatus that has collected the user information.

15. The user authentication method as claimed in claim 12, further comprising, if the amount of collected user information is less than the predetermined amount of information, requesting additional user information.

16. The user authentication method as claimed in claim 11, further comprising storing user authentication information indicating whether a user is authorized,
wherein the authenticating the user comprises authenticating the user by identifying the stored user authentication information corresponding to the user.

17. The user authentication method as claimed in claim 11, wherein the amount of information comprises a number of the plurality of portable devices.

18. A non-transitory computer readable recording medium which stores a program for executing a user authentication method, the user authentication method comprising:
collecting authentication information on a plurality of portable devices of a user via a communication network;
identifying whether each of the plurality of portable devices is registered for the user based on the collected authentication information and determining whether an amount of information collected from the plurality of portable devices that are identified is greater than a predetermined amount of information and whether the plurality of portable devices include a portable device predetermined to be indispensable for user authentication; and
authenticating the user if it is determined that the amount of information collected from the plurality of portable devices that are identified is greater than the predetermined amount of information, and the plurality of portable devices include the portable device predetermined to be indispensable for user authentication.

* * * * *